US012723807B2

(12) United States Patent
Wang et al.

(10) Patent No.: US 12,723,807 B2
(45) Date of Patent: Sep. 1, 2026

(54) SOUND-ABSORBING MATERIAL, METHOD FOR PREPARING SAME, AND SPEAKER USING THE SOUND-ABSORBING MATERIAL

(71) Applicant: AAC Microtech (Changzhou) Co., Ltd., Changzhou (CN)

(72) Inventors: Zhongyang Wang, Changzhou (CN); Jie Zhang, Changzhou (CN); Hezhi Wang, Changzhou (CN); Chao Wang, Changzhou (CN)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 275 days.

(21) Appl. No.: 18/742,882

(22) Filed: Jun. 13, 2024

(65) Prior Publication Data

US 2025/0290694 A1 Sep. 18, 2025

Related U.S. Application Data

(63) Continuation of application No. PCT/CN2024/082194, filed on Mar. 18, 2024.

(51) Int. Cl.

*F26B 5/06* (2006.01)
*F26B 25/20* (2006.01)
*G10K 11/165* (2006.01)

(52) U.S. Cl.

CPC ................ *F26B 5/06* (2013.01); *F26B 25/20* (2013.01); *G10K 11/165* (2013.01); *F26B 2210/02* (2013.01)

(58) Field of Classification Search

CPC ........ F26B 5/06; F26B 25/20; F26B 2210/02; G10K 11/165

See application file for complete search history.

(56) References Cited

U.S. PATENT DOCUMENTS

2007/0227814 A1* 10/2007 Schabel ................ E04B 1/7604 428/407
2019/0315659 A1* 10/2019 Pelot ....................... C04B 28/14
2021/0348844 A1* 11/2021 Ganguly ................... F26B 5/06
2023/0211579 A1* 7/2023 Hu .......................... B32B 21/04 428/219
2025/0242099 A1* 7/2025 Goldsmith ........ A61M 39/0247

* cited by examiner

*Primary Examiner* — Forrest M Phillips
(74) *Attorney, Agent, or Firm* — Wiersch Law Group

(57) ABSTRACT

Disclosed is a sound-absorbing material, a method, and a speaker, a sound-absorbing slurry is frozen by using a freezing conveyor belt, and the sound-absorbing slurry is then molded by a mold or coated onto a film. During pre-cooling of the sound-absorbing slurry in a first freezing zone of the conveyor belt, temperatures of the mold and a carrier film are reduced, followed by rapid freezing in a second freezing zone. Pre-cooling the mold in advance ensures uniform freezing of the sound-absorbing slurry. The freezing time of the material may be controlled by adjusting the speed of the conveyor belt. A temperature gradient is formed between the freezing conveyor belt and hot air thereabove. This enhances the top-bottom permeability of the sound-absorbing material, and thus improves the performance of the sound-absorbing material. The preparation efficiency of sound-absorbing material is increased, thereby facilitating scalable mass production is facilitated.

19 Claims, 2 Drawing Sheets

SOUND-ABSORBING MATERIAL, METHOD FOR PREPARING SAME, AND SPEAKER USING THE SOUND-ABSORBING MATERIAL

CROSS REFERENCE TO RELATED APPLICATIONS

The present application is a continuation of PCT Patent Application No. PCT/CN2024/082194, entitled "SOUND-ABSORBING MATERIAL, METHOD FOR PREPARING SAME, AND SPEAKER USING THE SOUND-ABSORBING MATERIAL," filed Mar. 18, 2024, which is incorporated by reference herein in its entirety.

TECHNICAL FIELD

The present disclosure relates to the technical field of electroacoustics, and in particular, relates to a sound-absorbing material, a method for preparing the same, and a speaker using the sound-absorbing material.

BACKGROUND

With the development of slim and lightweight electronic devices, speaker systems within these electronic devices are also becoming increasingly smaller. In order to enhance the acoustic performance within a limited resonance space of the speaker, it is common practice in the field to incorporate sound-absorbing materials. These materials take advantage of an adsorption-desorption effect on air to virtually increase the volume of a resonance cavity.

Typically, the sound-absorbing materials are made from porous inorganic powder by a special molding process. While the preparation process for particle-shaped sound-absorbing materials is relatively mature, using such materials to fill speakers faces some challenges. Particle-to-particle static electricity often makes it difficult to completely fill the resonance space, and collisions between particles may result in powder loss. In contrast, sound-absorbing blocks and sheets may be shaped to match the cavity, thereby eliminating the need for filling processes. Such sound-absorbing materials achieve a better sound-absorbing performance while avoiding static electricity interference. However, in actual preparation, a sound-absorbing slurry is often subject to issues such as fracturing and breakage upon freezing. This is due to the expansion of the volume of the sound-absorbing slurry at low temperatures, as well as the formation of layered ice crystals during freezing, resulting in thick, plate-like pores upon freeze-drying. As a result, the strength of the block material is compromised, leading to poor performance and susceptibility to breakage. Currently, there is no perfect preparation process for the sound-absorbing material, and the sound-absorbing blocks and sheets are still in the stage of small-scale trial production. The preparation process is cumbersome, resulting in low yields and poor reproducibility.

Therefore, there is an urgent need for a new sound-absorbing material, a method for preparation the same, and a speaker box using the sound-absorbing material, to address the aforementioned issues.

SUMMARY

An object of the present disclosure is to provide a sound-absorbing material, a method for preparation the same, and a speaker box using the sound-absorbing material, to enhance stability and adjustability of the preparation of the sound-absorbing material, improve the efficiency of production of the sound-absorbing material, and facilitate scalable mass production.

In a first aspect, some embodiments of the present disclosure provide a method for preparing a sound-absorbing material. The method includes:

- S1, formulating a sound-absorbing slurry, the sound-absorbing slurry being composed of a mixture of a sound-absorbing powder, an adhesive, a filler, a thickener, and water; wherein the sound-absorbing slurry has a viscosity of 100 cP to 10000 cP, and relative to 100% of a total mass of the sound-absorbing slurry, the sound-absorbing powder accounts for 30% to 60%, the adhesive accounts for 3% to 10%, the filler accounts for 1% to 10%, the thickener accounts for 1% to 5%, and the water accounts for 15% to 65%;
- S2, coating the sound-absorbing slurry onto a surface of a film; or injecting the sound-absorbing slurry into a mold;
- S3, placing the film or the mold at an inlet of a freezing conveyor belt, and sequentially freezing and crystallizing the film or the mold in a first freezing zone and a second freezing zone to obtain a film sample and a mold sample; wherein a temperature in the second freezing zone is lower than a temperature in the first freezing zone;
- S4, taking out the film sample or the mold sample from an exit end of the freezing conveyor belt, and placing the film sample or the mold sample into a low-pressure vacuum environment with a pressure of 0 to 500 Pa for a sublimation treatment to remove ice in the film sample or the mold sample to obtain an ice-free sample; and
- S5, placing the ice-free sample into an oven for drying for a predetermined duration to obtain the sound-absorbing material.

As an improvement the sound-absorbing powder includes zeolite, and the zeolite is at least one of an MFI molecular sieve, an MEL molecular sieve, or an FER molecular sieve.

As an improvement, the adhesive includes at least one of an acrylic emulsion, a styrene-acrylic emulsion, a styrene-butadiene emulsion, or a polyvinyl acetate salt.

As an improvement, the filler includes at least one of mica flakes, glass fiber, carbon fiber, or graphene.

As an improvement, the thickener includes at least one of sodium alginate, polyacrylamide, sodium polyacrylate, gelatin, or sodium carboxymethyl cellulose.

In some embodiments, the freezing conveyor belt includes a conveyor belt device driven by a roller, a liquid nitrogen box arranged on the conveyor belt device, and a copper plate secured to the conveyor belt device; wherein the copper plate is immersed in liquid nitrogen in the liquid nitrogen box and is configured to regulate the temperature of the second freezing zone, a liquid inlet port is arranged in the liquid nitrogen box at an inlet of the first freezing zone, and a height difference between the liquid nitrogen box and the conveyor belt device ranges from 0.5 cm to 5.0 cm.

As an improvement, the temperature of the first freezing zone ranges from −20° C. to 0° C., and the temperature of the second freezing zone ranges from −100° C. to −20° C.

As an improvement, in S3, time for freezing and crystallizing the film or the mold in the first freezing zone and the second freezing zone ranges from 1 minute to 30 minutes.

As an improvement, the film sample has a thickness of 0.05 mm to 1.00 mm; and the mold sample has a thickness of 1 mm to 5 mm.

In a second aspect, some embodiments of the present disclosure provide a sound-absorbing material, wherein the sound-absorbing material is prepared by the method for preparing the sound-absorbing material as described above.

As an improvement the sound-absorbing powder includes zeolite, and the zeolite is at least one of an MFI molecular sieve, an MEL molecular sieve, or an FER molecular sieve.

As an improvement, the adhesive includes at least one of an acrylic emulsion, a styrene-acrylic emulsion, a styrene-butadiene emulsion, or a polyvinyl acetate salt.

As an improvement, the filler includes at least one of mica flakes, glass fiber, carbon fiber, or graphene.

As an improvement, the thickener includes at least one of sodium alginate, polyacrylamide, sodium polyacrylate, gelatin, or sodium carboxymethyl cellulose.

In some embodiments, the freezing conveyor belt includes a conveyor belt device driven by a roller, a liquid nitrogen box arranged on the conveyor belt device, and a copper plate secured to the conveyor belt device; wherein the copper plate is immersed in liquid nitrogen in the liquid nitrogen box and is configured to regulate the temperature of the second freezing zone, a liquid inlet port is arranged in the liquid nitrogen box at an inlet of the first freezing zone, and a height difference between the liquid nitrogen box and the conveyor belt device ranges from 0.5 cm to 5.0 cm.

As an improvement, the temperature of the first freezing zone ranges from −20° C. to 0° C., and the temperature of the second freezing zone ranges from −100° C. to −20° C.

As an improvement, in S3, time for freezing and crystallizing the film or the mold in the first freezing zone and the second freezing zone ranges from 1 minute to 30 minutes.

As an improvement, the film sample has a thickness of 0.05 mm to 1.00 mm; and the mold sample has a thickness of 1 mm to 5 mm.

In a third aspect, some embodiments of the present disclosure provide a speaker box. The speaker box includes: a housing having a receiving space, and a speaker unit received in the housing, the speaker unit and the housing defining a rear chamber, wherein the rear chamber is filled with the sound-absorbing material as described above.

Compared to the related art, according to the present disclosure, a sound-absorbing slurry is frozen by using a freezing conveyor belt, and the sound-absorbing slurry is then molded by a mold or coated onto a film. During pre-cooling of the sound-absorbing slurry in a first freezing zone of the conveyor belt, temperatures of the mold and a carrier film are reduced, followed by rapid freezing in a second freezing zone, such that freezing time of the material is shortened. Pre-cooling the mold in advance ensures uniform freezing of the sound-absorbing slurry, thereby preventing formation of thick layer-like ice crystals and minimizing deformation of the material. At the second freezing zone of the conveyor belt, a copper plate is closely attached beneath the belt, and the copper plate is immersed in liquid nitrogen, which allows the temperature of the second freezing zone to be adjustable within the range of −100° C. to −20° C., such that rapid freezing and crystallization are achieved. The freezing time of the material may be controlled by adjusting the speed of the conveyor belt. Additionally, a temperature gradient is formed between the freezing conveyor belt and hot air thereabove, such that the sound-absorbing material is frozen from bottom to top. This enhances the top-bottom permeability of the sound-absorbing material, and thus improves the performance of the sound-absorbing material. By the preparation process according to the present disclosure, the preparation efficiency of sound-absorbing material is increased, and thus scalable mass production is facilitated.

BRIEF DESCRIPTION OF THE DRAWINGS

For clearer descriptions of the technical solutions according to the embodiments of the present disclosure, drawings that are to be referred for description of the embodiments are briefly described hereinafter. Apparently, the drawings described hereinafter merely illustrate some embodiments of the present disclosure. Persons of ordinary skill in the art may also derive other drawings based on the drawings described herein without any creative effort.

DETAILED DESCRIPTION

The technical solutions in the embodiments of the present disclosure are described in detail clearly and completely hereinafter with reference to the accompanying drawings for the embodiments of the present disclosure. Apparently, the described embodiments are only a portion of embodiments of the present disclosure, but not all the embodiments of the present disclosure. Based on the embodiments of the present disclosure, all other embodiments derived by persons of ordinary skill in the art without any creative efforts shall fall within the protection scope of the present disclosure.

Figure 1:
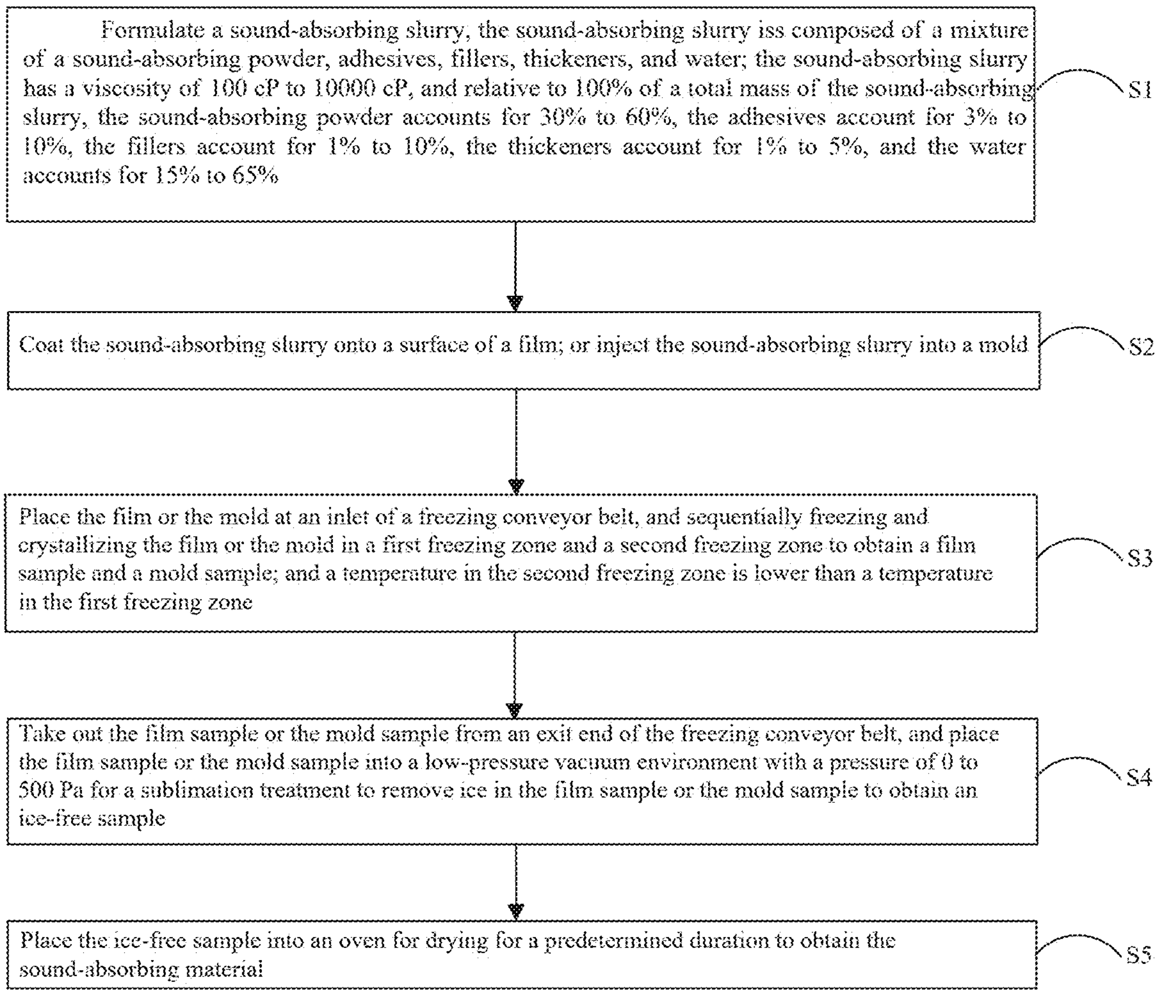
FIG. 1 is a flowchart of a method for preparing a sound-absorbing material according to some embodiments of the present disclosure.
Figure 2:
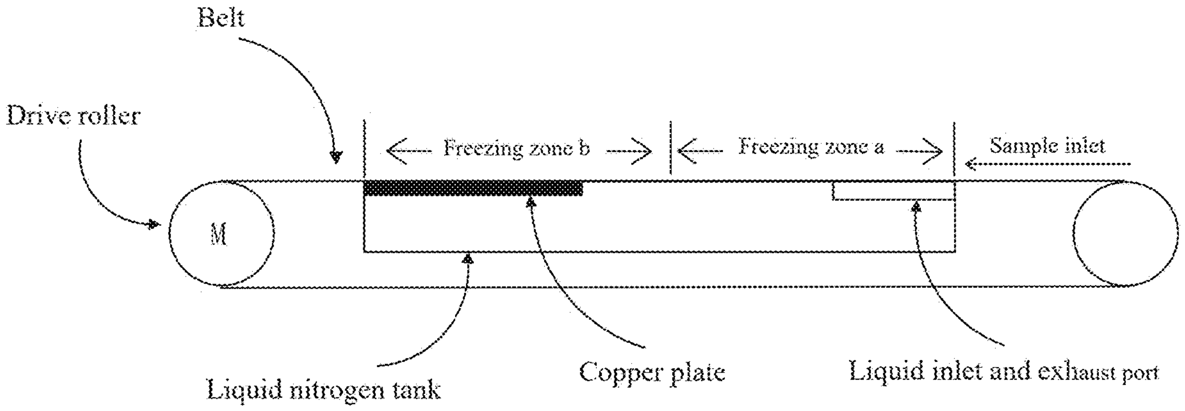
FIG. 2 is a schematic structural diagram of a freezing conveyor belt according to some embodiments of the present disclosure.

Referring to FIG. 1 to FIG. 2, some embodiments of the present disclosure provide a method for preparing a sound-absorbing material. The method includes as follows:

S1, formulating a sound-absorbing slurry, the sound-absorbing slurry is composed of a mixture of a sound-absorbing powder, adhesives, fillers, thickeners, and water. The sound-absorbing slurry has a viscosity of 100 cP to 10000 cP. Relative to 100% of a total mass of the sound-absorbing slurry, the sound-absorbing powder accounts for 30% to 60%, the adhesives account for 3% to 10%, the fillers account for 1% to 10%, the thickeners account for 1% to 5%, and the water accounts for 15% to 65%.

S2, coating the sound-absorbing slurry onto a surface of a film; or injecting the sound-absorbing slurry into a mold.

S3, placing the film or the mold at an inlet of a freezing conveyor belt, and sequentially freezing and crystallizing the film or the mold by a first freezing zone and a second freezing zone to obtain a film sample and a mold sample. A temperature in the second freezing zone is lower than a temperature in the first freezing zone.

S4, taking out the film sample or the mold sample from an exit end of the freezing conveyor belt, and placing the film sample or the mold sample into a low-pressure vacuum environment with a pressure of 0 to 500 Pa for a sublimation treatment to remove ice in the film sample or the mold sample to obtain an ice-free sample.

S5, placing the ice-free sample into an oven for drying for a predetermined duration to obtain the sound-absorbing material.

In the embodiments, the sound-absorbing powder includes zeolite, and the zeolite is at least one of an MFI molecular sieve, an MEL molecular sieve, or an FER molecular sieve.

In the embodiments, the adhesives comprise at least one of an acrylic emulsion, a styrene-acrylic emulsion, a styrene-butadiene emulsion, or a polyvinyl acetate salt.

In the embodiments, the fillers include at least one of mica flakes, glass fiber, carbon fiber, or graphene.

In the embodiments, the thickeners comprise at least one of sodium alginate, polyacrylamide, sodium polyacrylate, gelatin, or sodium carboxymethyl cellulose.

In the embodiments, the freezing conveyor belt includes a conveyor belt device driven by a roller, a liquid nitrogen box arranged on the conveyor belt device, and a copper plate secured to the conveyor belt device. The copper plate is immersed in liquid nitrogen in the liquid nitrogen box and is configured to regulate the temperature of the second freezing zone, a liquid inlet port is arranged in the liquid nitrogen box at an inlet of the first freezing zone, and a height difference between the liquid nitrogen box and the conveyor belt device ranges from 0.5 cm to 5.0 cm.

In the embodiments, the temperature of the first freezing zone a is −20° C. to 0° C., and the temperature of the second freezing zone b is −100° C. to −20° C.

In the embodiments, in S3, time for freezing and crystallizing the film or the mold in the first freezing zone a and the second freezing zone b is 1 minute to 30 minutes.

In the embodiments, the film sample has a thickness of 0.05 mm to 1.00 mm.

In the embodiments, the mold sample has a thickness of 1 mm to 5 mm.

Compared to the related art, according to the present disclosure, a sound-absorbing slurry is frozen by using a freezing conveyor belt, and the sound-absorbing slurry is then molded by a mold or coated onto a film. During pre-cooling of the sound-absorbing slurry in a first freezing zone of the conveyor belt, temperatures of the mold and a carrier film are reduced, followed by rapid freezing in a second freezing zone, such that freezing time of the material is shortened. Pre-cooling the mold in advance ensures uniform freezing of the sound-absorbing slurry, thereby preventing formation of thick layer-like ice crystals and minimizing deformation of the material. At the second freezing zone of the conveyor belt, a copper plate is closely attached beneath the belt, and the copper plate is immersed in liquid nitrogen, which allows the temperature of the second freezing zone to be adjustable within the range of −100° C. to −20° C., such that rapid freezing and crystallization are achieved. The freezing time of the material may be controlled by adjusting the speed of the conveyor belt. Additionally, a temperature gradient is formed between the freezing conveyor belt and hot air thereabove, such that the sound-absorbing material is frozen from bottom to top. This enhances the top-bottom permeability of the sound-absorbing material, and thus improves the performance of the sound-absorbing material. By the preparation process according to the present disclosure, the preparation efficiency of the sound-absorbing block material is increased, and thus scalable mass production is facilitated.

Some embodiments of the present disclosure further provide a sound-absorbing material. The sound-absorbing material is prepared by the method for preparing the sound-absorbing material as described in the above embodiments. Therefore, the sound-absorbing material is capable of achieving the technical effects attained by the sound-absorbing material prepared using the preparation method as described above, which is not elaborated herein.

Some embodiments of the present disclosure further provide a speaker box. The speaker box includes: a housing having a receiving space, and a speaker unit received in the housing, the speaker unit and the housing defining a rear chamber. The rear chamber is filled with the sound-absorbing material as described in the above embodiments.

In the embodiments, the sound-absorbing sheets may be cut to the same shape as the resonant cavity (rear cavity) of the speaker according to actual needs.

In the embodiments, the shape of the mold is the same as the resonant cavity (rear cavity) of the speaker. The mold may be configured as a regular shape such as rectangular, circular, oval, or the like, or an irregular shape based on actual needs.

The speaker box is capable of achieve the technical effects attained by the sound-absorbing material described in the above embodiments, which is not be elaborated herein.

For better illustration of the method for preparing the sound-absorbing material, further description is given hereinafter by way of preparation examples. It should be understood that the specific examples described here are only intended to explain the present disclosure and are not intended to limit the present disclosure.

Example 1

In this example, zeolite, acrylic emulsion, glass fibers, sodium alginate, and water were mixed and stirred, yielding a mixed slurry with a viscosity of 500 cP. The mixed slurry was then coated onto the surface of a PET film to obtain a film sample with a thickness of 1 mm. The film sample was then placed at the inlet of the freezing conveyor belt. The temperature in the first freezing zone a was set to −20° C., and the temperature of the second freezing zone b was set to −60° C. The conveyor belt was started, and the sound-absorbing material was frozen for 1 minute. At the outlet of the freezing conveyor belt, the frozen film sample was placed in a low-pressure vacuum environment of less than 400 Pa until all the moisture in the sample sublimates. The resulting de-iced sample was then placed in an oven at 120° C. and dried for 2 hours. After drying, the sample was cut into sheets that matched the shape of the resonance cavity (back cavity) of a speaker, yielding sound-absorbing sheets.

Example 2

In this example, zeolite, acrylic emulsion, glass fibers, polyacrylamide, and water were mixed and stirred, yielding a mixed slurry with a viscosity of 1000 cP. The mixed slurry was then poured into a mold to obtain a mold sample with a thickness of 2.5 mm. The mold sample was then placed at the inlet end of a conveyor belt. The temperature in the first freezing zone a was set to −20° C., and the temperature of the second freezing zone b was set to −80° C. The conveyor belt was started, and the sound-absorbing material was frozen for 5 minutes. At the outlet end, the frozen mold sample was placed in a low-pressure vacuum environment of less than 400 Pa until all the moisture in the sample sublimates. The resulting de-iced sample was then placed in an oven at 120° C. and dried for 2 hours, yielding sound-absorbing blocks.

Comparative Example 1

In this example, zeolite, acrylic emulsion, glass fibers, polyacrylamide, and water were mixed and stirred, yielding a mixed slurry with a viscosity of 3000 cP. The mixed slurry was then poured into a mold to obtain a mold sample with a thickness of 2.5 mm. The mold sample was then placed in a constant temperature environment at −30° C. and frozen for 20 minutes. The frozen mold sample was then placed in a low-pressure vacuum environment of less than 400 Pa until all the moisture in the sample sublimates. The sample was then placed in an oven at 120° C. and dried for 2 hours, yielding sound-absorbing blocks.

For a comparison of performance between samples of the sound-absorbing material prepared in the Examples and in the Comparative Examples, the performance of the sound-absorbing materials was measured using an impedance meter. The results are shown in Table 1. Conventional particle-shaped sound-absorbing materials in the field were used for comparison. For ease of the comparison, 100 mg samples were selected for all tests.

TABLE 1

Comparison between samples according to different examples

| Sample | ΔF0/Hz |
|---|---|
| Regular particular sound-absorbing material | 180 |
| Example 1 | 205 |
| Example 2 | 196 |
| Comparative Example 1 | 135 |

ΔF0 represents an amount of variation in resonant frequency, which characterizes the improvement in the acoustic performance of the speaker module by the sound-absorbing material. The larger the value of ΔF0, the better the optimization and tuning effect of the sound-absorbing material on the acoustic performance of the speaker module; conversely, the smaller the value of ΔF0, the poorer the optimization and tuning effect of the sound-absorbing material on the acoustic performance of the speaker module.

From Table 1, it can be seen that both the sound-absorbing blocks and sound-absorbing sheets have superior sound-absorbing performance compared to conventional sound-absorbing particles in the field. The performance of the sample in Comparative Example 1 is relatively poor, as the surface of the sound-absorbing block shows large pores and a loose structure. Described above are merely exemplary embodiments or examples illustrating the present disclosure, instead of limiting the scope of the present disclosure.

Although some specific embodiments of the present disclosure have been described in detail by way of examples, those skilled in the art should understand that these examples are intended for illustration purposes only and not to limit the scope of the present disclosure. Those skilled in the art should understand that modifications may be made to the above embodiments without departing from the scope and spirit of the present disclosure. The scope of the present invention is defined by the appended claims.

Described above are merely exemplary embodiments of the present disclosure. It should be noted that persons of ordinary skill in the art would make various improvements without departing from the inventive concept of the present disclosure, and such improvements shall fall within the protection scope of the present disclosure.

The invention claimed is:

1. A method for preparing a sound-absorbing material, comprising:

S1, formulating a sound-absorbing slurry, the sound-absorbing slurry being composed of a mixture of a sound-absorbing powder, adhesives, fillers, thickeners, and water; wherein the sound-absorbing slurry has a viscosity of 100 cP to 10000 cP, and relative to 100% of a total mass of the sound-absorbing slurry, the sound-absorbing powder accounts for 30% to 60%, the adhesives account for 3% to 10%, the fillers account for 1% to 10%, the thickeners accounts for 1% to 5%, and the water account for 15% to 65%;

S2, coating the sound-absorbing slurry onto a surface of a film; or injecting the sound-absorbing slurry into a mold;

S3, placing the film or the mold at an inlet of a freezing conveyor belt, and sequentially freezing and crystallizing the film or the mold in a first freezing zone and a second freezing zone to obtain a film sample and a mold sample; wherein a temperature in the second freezing zone is lower than a temperature in the first freezing zone;

S4, taking out the film sample or the mold sample from an exit end of the freezing conveyor belt, and placing the film sample or the mold sample into a low-pressure vacuum environment with a pressure of 0 to 500 Pa for a sublimation treatment to remove ice in the film sample or the mold sample to obtain an ice-free sample; and S5, placing the ice-free sample into an oven for drying for a predetermined duration to obtain the sound-absorbing material.

2. The method according to claim 1, wherein the sound-absorbing powder comprises zeolite, and the zeolite is at least one of an MFI molecular sieve, an MEL molecular sieve, or an FER molecular sieve.

3. The method according to claim 1, wherein the adhesives comprise at least one of an acrylic emulsion, a styrene-acrylic emulsion, a styrene-butadiene emulsion, or a polyvinyl acetate salt.

4. The method according to claim 1, wherein the fillers comprise at least one of mica flakes, glass fiber, carbon fiber, or graphene.

5. The method according to claim 1, wherein the thickeners comprise at least one of sodium alginate, polyacrylamide, sodium polyacrylate, gelatin, or sodium carboxymethyl cellulose.

6. The method according to claim 1, wherein the freezing conveyor belt comprises a conveyor belt device driven by a roller, a liquid nitrogen box arranged on the conveyor belt device, and a copper plate secured to the conveyor belt device; wherein the copper plate is immersed in liquid nitrogen in the liquid nitrogen box and is configured to regulate the temperature of the second freezing zone, a liquid inlet port is arranged in the liquid nitrogen box at an inlet of the first freezing zone, and a height difference between the liquid nitrogen box and the conveyor belt device ranges from 0.5 cm to 5.0 cm.

7. The method according to claim 1, wherein the temperature of the first freezing zone is −20° C. to 0° C., and the temperature of the second freezing zone is −100° C. to −20° C.

8. The method according to claim 1, wherein in S3, time for freezing and crystallizing the film or the mold in the first freezing zone and the second freezing zone is 1 minute to 30 minutes.

9. The method according to claim 1, wherein the film sample has a thickness of 0.05 mm to 1.00 mm; and the mold sample has a thickness of 1 mm to 5 mm.

10. A sound-absorbing material, wherein the sound-absorbing material is prepared by the method for preparing the sound-absorbing material according to claim 1.

11. The sound-absorbing material according to claim 10, wherein the sound-absorbing powder comprises zeolite, and the zeolite is at least one of an MFI molecular sieve, an MEL molecular sieve, or an FER molecular sieve.

12. The sound-absorbing material according to claim 10, wherein the adhesives comprise at least one of an acrylic emulsion, a styrene-acrylic emulsion, a styrene-butadiene emulsion, or a polyvinyl acetate salt.

13. The sound-absorbing material according to claim 10, wherein the fillers comprise at least one of mica flakes, glass fiber, carbon fiber, or graphene.

14. The sound-absorbing material according to claim 10, wherein the thickeners comprise at least one of sodium alginate, polyacrylamide, sodium polyacrylate, gelatin, or sodium carboxymethyl cellulose.

15. The sound-absorbing material according to claim 10, wherein the freezing conveyor belt comprises a conveyor belt device driven by a roller, a liquid nitrogen box arranged on the conveyor belt device, and a copper plate secured to the conveyor belt device; wherein the copper plate is immersed in liquid nitrogen in the liquid nitrogen box and is configured to regulate the temperature of the second freezing zone, a liquid inlet port is arranged in the liquid nitrogen box at an inlet of the first freezing zone, and a height difference between the liquid nitrogen box and the conveyor belt device ranges from 0.5 cm to 5.0 cm.

16. The sound-absorbing material according to claim 10, wherein the temperature of the first freezing zone is −20° C.-0° C., and the temperature of the second freezing zone is −100° C. to −20° C.

17. The sound-absorbing material according to claim 10, wherein in S3, time for freezing and crystallizing the film or the mold in the first freezing zone and the second freezing zone is 1 minute to 30 minutes.

18. The sound-absorbing material according to claim 10, wherein the film sample has a thickness of 0.05 mm to 1.00 mm; and the mold sample has a thickness of 1 mm to 5 mm.

19. A speaker box, comprising: a housing having a receiving space, and a speaker unit received in the housing, the speaker unit and the housing defining a rear chamber, wherein the rear chamber is filled with the sound-absorbing material according to claim 10.

* * * * *